United States Patent
Clemence et al.

[15] 3,700,677
[45] Oct. 24, 1972

[54] CERTAIN THIAZOLE-5-CARBOXYLATES

[72] Inventors: Francois Clemence, Rosny-sous-Bois; Odile Le Martret, Paris, both of France

[73] Assignee: Roussel-UcLaf, Paris, France

[22] Filed: July 15, 1969

[21] Appl. No.: 842,016

[30] Foreign Application Priority Data

July 18, 1968 France....................68159716
Oct. 16, 1968 France....................68170114

[52] U.S. Cl.....260/294.8 D, 260/241.1, 260/293.68, 260/302, 424/248, 424/263, 424/267, 424/270
[51] Int. Cl. ............................................C07d 91/32
[58] Field of Search...260/302 R, 294.8, 247.1, 293.68

[56] References Cited

OTHER PUBLICATIONS

Erlenmeyer et al., Chem. Abstracts, 43:221 (1949).
Smith et al., Chem. Abstracts, 19:1706 (1925).
Wagner et al., Synthetic Organic Chemistry, N.Y.C., Wiley, 1953, pp. 480–481.

*Primary Examiner*—Alex Mazel
*Assistant Examiner*—R. J. Gallagher
*Attorney*—Hammond & Littell

[57] ABSTRACT

5-thiazol carboxylates of the formula

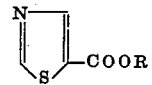

I wherein R is an alkali-metal atom, the residue of an organic base or the alkyl radical of an aliphatic, arylaliphatic or alkylheterocyclic alcohol having hypolipemiant activity and their preparation.

8 Claims, No Drawings

CERTAIN THIAZOLE-5-CARBOXYLATES

OBJECTS OF THE INVENTION

It is an object of the invention to provide novel 5-thiazol carboxylates of formula I.

It is another object of the invention to provide a novel process for the preparation of the compounds of formula I.

It is a further object of the invention to provide novel hypolipemiant compositions.

It is an additional object of the invention to provide a novel method of reducing the amount of sanguine lipids in warm-blooded animals.

These and other objects and advantages of the invention will become obvious from the following detailed description.

THE INVENTION

The novel compounds of the invention are 5-thiazol carboxylates of the formula

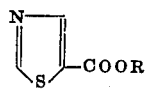

wherein R is an alkali-metal atom, the residue of an organic base or the alkyl radical of an aliphatic, arylaliphatic or alkylheterocyclic alcohol.

The substituent R is preferably an alkali-metal atom, or the residue of an organic base such as triethylamine, diisopropylamine, diethylamine, ethanolamine, a collidine, morpholine or piperidine, or the alkyl residue of an aliphatic alcohol containing one to 10 carbon atoms, the alkyl residue of an arylaliphatic alcohol, the aliphatic residue of which contains one to six carbon atoms, the alkyl residue of an alkylheterocyclic alcohol, the aliphatic residue of which contains one to six carbon atoms and the heterocyclic residue of which is the furyl group, thienyl group or pyridyl group.

The compounds of the invention are endowed with interesting pharmacological properties. They possess in particular a remarkable hypolipemiant activity which is manifested by a very significant drop in the amount of triglycerides. They are devoid of troublesome secondary effects, having only a very slight or no vasodilating action.

Preferred compounds of formula I are:
sodium 5-thiazol carboxylate,
(3'-pyridyl) methyl 5-thiazol carboxylate,
2'-p-chlorophenoxy 2'-methylpropyl 5-thiazol carboxylate,
isopropylidene pyridoxine 5-thiazol carboxylate,
N-diethylamino ethyl 5-thiazol carboxylate, and its salts of mineral or organic acids,
2',2'-dimethyl 1'-propyl 5-thiazol carboxylate.

The novel process of the invention for the preparation of compounds of formula I comprises reacting an alkaline or organic base or an alcohol with 5-thiazol carboxylic acid or a functional derivative thereof in the presence of a tertiary amine to form the desired salt or ester of 5-thiazol carboxylic acid. When 5-thiazol carboxylic acid is esterified by an amino-alcohol, disubstituted on the nitrogen, the resulting ester can be converted into a salt by the action of a mineral or organic acid.

Preferably, the salification of the 5-thiazol carboxylic acid is effected by means of an alkaline base, for example, an alkali-metal hydroxide or carbonate;

the salification of the 5-thiazol carboxylic acid is effected by means of an organic base, for example, triethylamine;

the esterification of the 5-thiazol carboxylic acid is effected by the action of a halide of 5-thiazol carboxylic acid on an alcohol, in the presence of a halogen acid acceptor;

the halogen acid acceptor is a tertiary amine, for example, triethylamine.

The novel hypolipemiant compositions of the invention are comprised of an effective amount of at least one compound of formula I and a major amount of a pharmaceutical carrier. The compositions may be in the form of tablets, coated tablets, cachets, capsules, granules, emulsions, syrups and suppositories prepared in the usual manner.

The individual dose is 0.2 g to 1 g depending upon the method of administration.

The hypolipemiant compositions are useful for the treatment of acute or chronic hyperlipemia, atheromatosis, hepatic or toxic steatoses and lipoidic nephroses.

The novel method of the invention of reducing the amount of sanguine lipids in warm-blooded animals comprises administering to warm-blooded animals a safe and effective amount of at least one compound of formula I.

The said compounds may be administered orally or rectally.

The usual useful daily dose is 15 to 85 mg/kg depending upon the method of administration.

In the following examples there are described several preferred embodiments to illustrate the invention. However, it should be understood that the invention is not intended to be limited to the specific embodiments.

EXAMPLE I: SODIUM 5-THIAZOL CARBOXYLATE (R = Na)

One dissolves 10.25 g. of 5-thiazol carboxylic acid in the stoichiometric quantity of 0.5 N caustic soda and evaporates the water under reduced pressure; one then triturates the residue in alcohol then in ether and dries; one obtains sodium 5-thiazol carboxylate with a yield of 97 percent; its melting point is higher than 300° C.

Analysis: $C_4H_2NO_2SNa = 151.12$
Calculated: N percent 9.26
Found: 9.12

As far as is known, this compound is not described in the literature.

The starting product, 5-thiazol carboxylic acid, is obtained according to the process described by H. ERLENMEYER and H. VON MEYENBURG Helv. Chem. Acta 20, 204, 1937 or H. ERLENMEYER and R. MARBET Helv. Chem. Acta 29, 1946–1949, (1946).

EXAMPLE II: (3'-PYRIDYL) METHYL 5-THIAZOL CARBOXYLATE

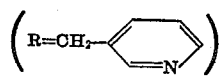

One pours a solution of 28.5 g. of 5-thiazol carboxylic acid chloride in 50 c.c. of ether, into a solution of 21 g. of 3-pyridyl methanol and 23.4 g. of triethylamine in 400 c.c. of ether, while keeping the temperature at 20° C; one agitates the reaction mixture for 1 hour 30 minutes at ambient temperature, filters, washes the ethereal phase with an aqueous solution of potassium carbonate, then with water and evaporates the solvent under reduced pressure; one obtains (3'-pyridyl) methyl 5-thiazol carboxylate in the form of colorless crystals, which, after recrystallization from isopropyl ether, melt at 64° C (Yield : 47 percent).

Analysis : $C_{10}H_8N_2O_2S = 220.24$
Calculated : N percent 12.72
Found : 12.73–12.72

As far as is known, this compound is not described in the literature.

5-Thiazol carboxylic acid chloride is obtained starting with 5-thiazol carboxylic acid according to the usual methods of chlorination.

EXAMPLE III : 2'-P-CHLOROPHENOXY 2'-METHYLPROPYL 5-THIAZOL CARBOXYLATE

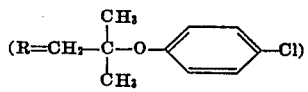

One pours a solution of 14.7 g. of 5-thiazol carboxylic acid chloride in 90 c.c. of acetone, into a solution of 18.15 g. of 2-p-chlorophenoxy 2-methyl 1-propanol and 12.21 g. of triethylamine in 50 c.c. of acetone, while keeping the temperature between 20° and 25° C; one agitates for 1 hour at ambient temperature, filters and distills off the solvent under reduced pressure; one takes up the residue with ether, washes the ethereal solution with an aqueous solution of sodium carbonate, then with water; one distills off the ether under reduced pressure and obtains 2'-p-chlorophenoxy 2'-methylpropyl 5-thiazol carboxylate in the form of colorless crystals which, after recrystallization from isopropanol, melt at 77° C (Yield : 76 percent).

Analysis : $C_{14}H_{14}ClNO_3S = 311.78$
Calculated : N percent 4.49 Cl percent 11.37
Found : 4.48–4.50 11.47–11.49

As far as is known, this compound is not described in the literature.

The starting product, 2-p-chlorophenoxy 2-methyl 1-propanol, is obtained in the following way:

One adds to a solution of 56.4 g. of ethyl p-chlorophenoxy isobutyrate in 250 c.c. of ether, a suspension of 8.8 g. of lithium-aluminum hydride in 250 c.c. of ether, while keeping the temperature between 0° and +5° C; one agitates the reaction mixture for 1 hour 30 minutes, at ambient temperature, adds 20 c.c. of water and filters; the filtrate is washed with water and distilled under reduced pressure; one obtains 39.60 g. of 2-p-chlorophenoxy 2-methyl 1-propanol, in the form of a liquid boiling at 99° – 102° C under 0.3 mm. of mercury (Yield : 85 percent), $[n]_D^{22} = 1.5281$.

Analysis : $C_{10}H_{13}ClO_2 = 200.65$
Calculated : Cl percent 17.67
Found : 17.72–17.61
I.R. Spectrum:

Presence of —OH at 3425 $cm^{-1}$

As far as is known, this compound is not described in the literature.

EXAMPLE IV : ISOPROPYLIDENE PYRIDOXINE 5-THIAZOL CARBOXYLATE

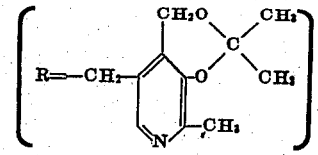

One adds to a solution of 5.55 g. of 5-thiazol carboxylic acid chloride in 40 c.c. of acetone, a solution of 8.11 g. of isopropylidene pyridoxine and 4.7 g. of triethylamine in 160 c.c. of acetone, while keeping the temperature between 20° and 25° C; one agitates for 1 hour 30 minutes at ambient temperature, filters and evaporates the solvent under reduced pressure; one takes up the residue with ether, washes the ethereal phase with an aqueous solution containing 10 percent potassium carbonate, then with water and distills off the ether; one obtains isopropylidene pyridoxine 5-thiazol carboxylate in the form of colorless crystals which, after recrystallization from ethanol, melt at 132° C (yield : 40 percent).

Analysis : $C_{15}H_{16}N_2O_4S = 320.36$
Calculated : N percent 8.74
Found : 8.67–8.67

As far as is known, this compound is not described in the literature.

The isopropylidene pyridoxine is obtained according to the process described by W. KORYTNYK and W. WIEDEMAN, J. Chem. Soc. 2531–2532 (1962).

EXAMPLE V: N-DIETHYLAMINO ETHYL 5-THIAZOL CARBOXYLATE DIHYDROCHLORIDE

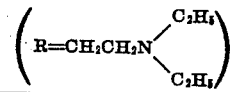

One adds, to 2.77 g. of 5-thiazol carboxylic acid chloride, 40 c.c. of diethylamino ethanol while cooling; then one heats the mixture to 100° C for half-an-hour and distills off the excess diethylamino ethanol under reduced pressure; one takes up the residue with 50 c.c. of ethanol and adds 2.87 g. of triethanolamine; one filters, distills the residual oil and collects the fraction boiling between 101° and 154° C under 10 mm. of mercury; one obtains diethylamino ethyl 5-thiazol carboxylate with a yield of 49 percent.

By treating this base with the stoichiometric quantity of hydrochloric acid in ethanol, one obtains diethylamino ethyl 5-thiazol carboxylate dihydrochloride in the form of colorless crystals which, after recrystallization from ethanol, melt at 116° C (Yield : 45.5 percent).

Analysis : $C_{10}H_{16}N_2O_2S, 2 HCl = 301.23$
Calculated : N percent 9.30 Cl percent 23.64
Found : 9.21 23.3–23.4

EXAMPLE VI: 2',2'-DIMETHYL 1'-PROPYL 5-THIAZOL CARBOXYLATE

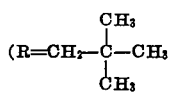

One slowly adds a solution of 5.5 g. of 5-thiazol carboxylic acid chloride in 20 c.c. of acetone to a solution of 3.10 g. of neopentyl alcohol and 4.73 g. of triethylamine in 20 c.c. of acetone; one filters, evaporates the solvent under reduced pressure and takes up the residue with ether; one washes the ethereal solution with an aqueous solution of 10 percent potassium carbonate, then with water; one drives off the ether and distills off the residual oil; one collects the fraction passing from 130° to 132° C under a pressure of 15 mm. of mercury and obtains 2',2'-dimethyl 1'-propyl 5-thiazol carboxylate, with a yield of 35.5 percent, in the form of a liquid, $[n]_D^{25} = 1.4929 – 1.4928$.

Analysis: $C_9H_{13}NO_2S = 199.26$
Calculated: N percent 7.03
Found: 7.22

As far as is known, this compound is not described in the literature.

PHARMACOLOGICAL DATA

A — Determination of Hypolipemiant Activity

The hypolipemiant activity was determined on rats using the method of Jacobs et al. (Proc. Soc. Exp. Biol. Med., 119 (4), 1965, pages 1,117–1,120). Male rats of the Wistar strain, having an average weight of 160–180 gm, were left without food for 24 hours. The studied product, used as an aqueous suspension, was then administered with an esophagus probe at doses of 20, 40, 80 and 160 mg/kg. The dosage of sanguine triglycerides was noted 4 hours after the product was administered. The glycerides in the blood were determined by dosage of glycerol. The results are given in Table I:

TABLE I

| | Doses administered | Amounts of triglycerides in mg % cc | % reduction |
|---|---|---|---|
| Control | 0 | 33.4 | — |
| 2'-p-chlorophenoxy | 20 mg/kg | 15.0 | −55 |
| 2'-methylpropyl- | 40 mg/kg | 16.4 | −51 |
| 5-thiazol | 80 mg/kg | 17.7 | −47 |
| carboxylate | 160 mg/kg | 12.4 | −63 |

Table I shows that the studied compound shows an important hypolipemiant activity even at a dose of 20 mg/kg.

B. Determination of Acute Toxicity

The acute toxicity was determined on male mice weighing about 20 gm. The product under study was administered as an aqueous suspension either by intraperitoneal route or orally.

The lethal dose, $LD_{50}$ of 2'-p-chlorophenoxy 2'-methyl propyl 5-thiazol carboxylate, which was determined according to the method of Miller et al., was 0.90 mg/kg by intraperitoneal route and more than 2 g/kg. orally.

Various modifications of the compoisitions and method of the invention may be made without departing from the spirit or scope thereof.

We claim:

1. A 5-thiazol carboxylate of the formula

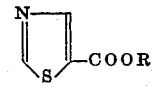

wherein R is selected from the group consisting of an alkali metal atom, triethylamino, diisopropylamino, diethylamino, ethanolamino, collidino, morpholino, piperidino and phenyl alkyls and chlorophenoxy alkyls with one to six alkyl carbon atoms and heterocyclic alkyls of one to six carbon atoms, said heterocyclic being selected from the group consisting of furyl, thienyl and pyridyl.

2. A compound of claim 1 which is sodium 5-thiazol carboxylate.

3. A compound of claim 1 which is (3'-pyridyl) methyl 5-thiazol carboxylate.

4. A compound of claim 1 which is 2'-p-chlorophenoxy 2'-methylpropyl 5-thiazol carboxylate.

5. A compound of claim 1 which is isopropylidene pyridoxine 5-thiazol carboxylate.

6. N-diethylamino-ethyl 5-thiazolcarboxylate and its non-toxic, pharmaceutically acceptable acid addition salts.

7. A compound of claim 1 which is the dihydrochloride of N-diethylaminoethyl 5-thiazolcarboxylate.

8. 2',2'-dimethyl 1'-propyl 5-thiazol carboxylate.

* * * * *